(12) United States Patent
Wu et al.

(10) Patent No.: US 11,134,287 B1
(45) Date of Patent: Sep. 28, 2021

(54) SYNCHRONIZING AUDIO CONTENT AND VIDEO CONTENT

(71) Applicant: Amazon Technologies, Inc., Seattle, WA (US)

(72) Inventors: Yongjun Wu, Bellevue, WA (US); Abhishek Kumar, Redmond, WA (US); Kyle Alexander Woo, Kent, WA (US); Mukund Manikarnike, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/948,425

(22) Filed: Sep. 17, 2020

(51) Int. Cl.
| | |
|---|---|
| *H04N 21/242* | (2011.01) |
| *H04N 21/237* | (2011.01) |
| *H04N 21/234* | (2011.01) |
| *H04N 21/233* | (2011.01) |
| *H04N 21/2343* | (2011.01) |
| *H04N 21/44* | (2011.01) |
| *H04N 21/23* | (2011.01) |

(52) U.S. Cl.
CPC .......... *H04N 21/242* (2013.01); *H04N 21/23* (2013.01); *H04N 21/233* (2013.01); *H04N 21/234* (2013.01); *H04N 21/237* (2013.01); *H04N 21/2335* (2013.01); *H04N 21/2343* (2013.01); *H04N 21/23424* (2013.01); *H04N 21/234381* (2013.01); *H04N 21/44* (2013.01)

(58) Field of Classification Search
None
See application file for complete search history.

(56) References Cited

U.S. PATENT DOCUMENTS

| | | |
|---|---|---|
| 10,313,722 B1 | 6/2019 | Searl et al. |
| 2012/0120314 A1 | 5/2012 | Yang et al. |
| 2015/0332732 A1 | 11/2015 | Gilson et al. |
| 2018/0158488 A1 | 6/2018 | Mangru |

OTHER PUBLICATIONS

US Office Action dated Dec. 31, 2018, issued in U.S. Appl. No. 15/717,373.
US Notice of Allowance dated Mar. 1, 2019 issued in U.S. Appl. No. 15/717,373.

*Primary Examiner* — Justin E Shepard
(74) *Attorney, Agent, or Firm* — Weaver Austin Villeneuve & Sampson LLP

(57) ABSTRACT

Techniques are described for synchronizing audio content and video content when server-side fragment insertion techniques are used.

18 Claims, 7 Drawing Sheets

Bitrate: 128 kbps

Fragment A: Time range =0 minutes 1 seconds to 0 minutes 5 seconds, Location = \Media\Movies\A093b2b_1.isma
Fragment B: Time range = 0 minutes 6 seconds to 0 minutes 10 seconds, Location = \Media\Movies\A093b2b_2.isma
Fragment X: Time range =0 minutes 11 seconds to 0 minutes 15 seconds, Location = \Media\Secondary\B22x_1.isma, audioversion = nondrop
Fragment Y: Time range = 0 minutes 16 seconds to 0 minutes 20 seconds, Location = \Media\Secondary\B22x_2.isma, audioversion = nondrop
Fragment Z: Time range = 0 minutes 21 seconds to 0 minutes 25 seconds, Location = \Media\Secondary\B22x_3.isma, audioversion = drop
Fragment C: Time range =0 minutes 26 seconds to 0 minutes 30 seconds, Location = \Media\Movies\A093b2b_3.isma
Fragment D Time range = 0 minutes 31 seconds to 0 minutes 35 seconds, Location = \Media\Movies\A093b2b_4.isma

Bitrate: 64 kbps

Fragment A: Time range =0 minutes 1 seconds to 0 minutes 5 seconds, Location = \Media\Movies\A093b2b10_1.isma
Fragment B: Time range = 0 minutes 6 seconds to 0 minutes 10 seconds, Location = \Media\Movies\A093b2b10_2.isma
Fragment X: Time range =0 minutes 11 seconds to 0 minutes 15 seconds, Location = \Media\Secondary\B22x10_1.isma, audioversion = nondrop
Fragment Y: Time range = 0 minutes 16 seconds to 0 minutes 20 seconds, Location = \Media\Secondary\B22x10_2.isma, audioversion = nondrop
Fragment Z: Time range = 0 minutes 21 seconds to 0 minutes 25 seconds, Location = \Media\Secondary\B22x10_3.isma, audioversion = drop
Fragment C: Time range =0 minutes 26 seconds to 0 minutes 30 seconds, Location = \Media\Movies\A093b2b10_3.isma
Fragment D Time range = 0 minutes 31 seconds to 0 minutes 35 seconds, Location = \Media\Movies\A093b2b10_4.isma

Bitrate: 32 kbps

Fragment A: Time range =0 minutes 1 seconds to 0 minutes 5 seconds, Location = \Media\Movies\A093b2b7_1.isma
Fragment B: Time range = 0 minutes 6 seconds to 0 minutes 10 seconds, Location = \Media\Movies\A093b2b7_2.isma
Fragment X: Time range =0 minutes 11 seconds to 0 minutes 15 seconds, Location = \Media\Secondary\B22x7_1.isma, audioversion = nondrop
Fragment Y: Time range = 0 minutes 16 seconds to 0 minutes 20 seconds, Location = \Media\Secondary\B22x7_2.isma, audioversion = nondrop
Fragment Z: Time range = 0 minutes 21 seconds to 0 minutes 25 seconds, Location = \Media\Secondary\B22x7_3.isma, audioversion = drop
Fragment C: Time range =0 minutes 26 seconds to 0 minutes 30 seconds, Location = \Media\Movies\A093b2b7_3.isma
Fragment D Time range = 0 minutes 31 seconds to 0 minutes 35 seconds, Location = \Media\Movies\A093b2b7_4.isma

*FIG. 4*

SYNCHRONIZING AUDIO CONTENT AND VIDEO CONTENT

BACKGROUND

Consumers have an ever-increasing array of options for consuming media content, in terms of the types of media content (e.g., video, audio, etc.), providers of the media content, and devices for consuming the media content. Media content providers are becoming increasingly sophisticated and effective at providing media content quickly and reliably to consumers.

Many older streaming devices include media players that cannot play back a bitstream that includes media content from more than one source (e.g., feature content and advertisement content). In addition, many streaming devices use media players that, with a software update, might be capable of playback of a bitstream that includes media content from more than one source. Unfortunately, the entity in control of delivering the media content is often different from the entity in control of the streaming devices and/or the update of their media players. Consequently, many streaming devices are currently unable to support playback of a bitstream that includes media content from more than one source.

BRIEF DESCRIPTION OF THE DRAWINGS

FIG. 4 is an example illustrating manifest data for delivery to a client device.

DETAILED DESCRIPTION

Figure 1A:
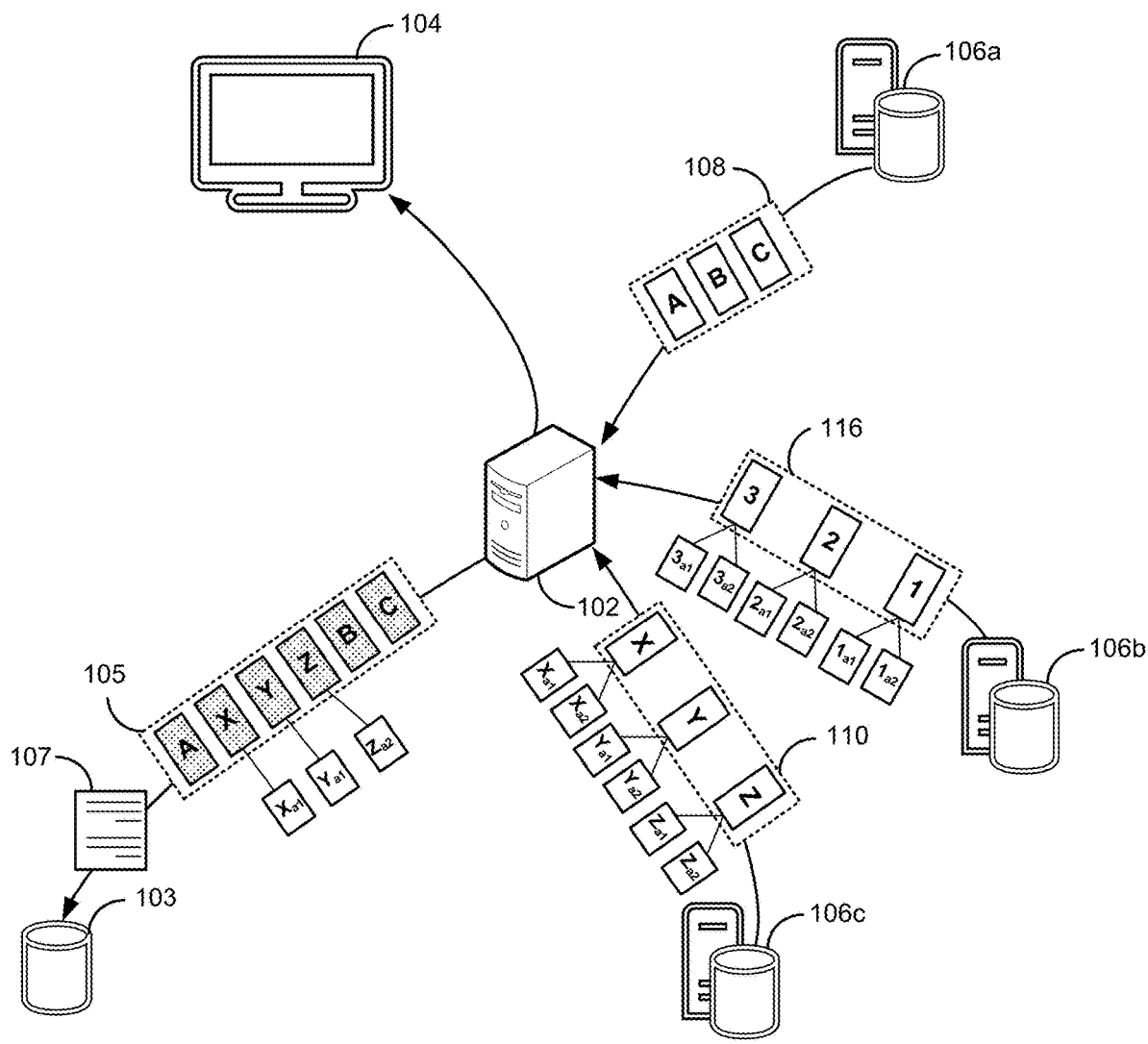
FIGS. 1A, 1B, and 1C illustrate an example of a system for synchronizing audio content and video content.

This disclosure describes techniques for synchronizing audio fragments and video fragments when static and dynamic secondary content is included with primary content using server-side fragment insertion techniques. Static secondary content may include content that is relatively unchanging, such as legal notices, studio or production company logos, additional credits, pre-roll media, post-roll media, etc. Dynamic secondary content may include content that changes more frequently, such as advertisements, public service announcements, etc. In order to insert different types of content into a manifest, video fragments can be generated with exact durations (e.g., 2 seconds). Unfortunately, audio sampling techniques do not always allow for audio fragments to be generated at durations that match the exact duration of the video fragments. Because the durations of video fragments and audio fragments are different, an increasingly apparent delay occurs between audio and video during playback which interferes with the playback experience of a user. The techniques described herein allow for removal of audio content frames to resynchronize audio and video content before the delay interferes with the playback experience.

A media server providing a given piece of primary media content may want to insert secondary content that varies for different target audiences. As an example, a media server providing a piece of primary media content may want to (a) include anti-tobacco public service announcements in certain counties (if there are depictions of tobacco products), (b) may want to include anti-piracy warnings (e.g., such as the Federal Bureau of Investigation's anti-piracy warning) in certain other countries, (c) may want to show a first distribution company's logo in a first country, but a second distribution company's logo in a second country, (d) may want to include an additional set of credits when an alternate version of the primary content is dubbed into a foreign language is requested, and (e) may want to include advertisements (which may be global, location-specific, user-specific, etc.). It should be readily apparent that there may be a large number of possible combinations of secondary content that the media server might want to include. Additionally, some combinations may be mutually-exclusive and the media server may not want to include unnecessary pieces of secondary content, as doing so could cause confusion and/or unnecessarily extend the amount of secondary content users receive. One technique for providing secondary content is to "burn in" the secondary content, such that the secondary content is permanently included in the primary media content. However, such an approach may not be suitable for advertisements, which change relatively frequently and would require encoding and storing numerous copies of the primary media content, each copy having a desired set of secondary content inserted therein. The present disclosure provides a mechanism to use the same primary media content presentation and then mix and match that single presentation with different sets of secondary content, including static secondary content and dynamic secondary content (e.g., advertisements), thus improving storage efficiency. Additionally, a single copy of static secondary content (e.g., a legal warning, a given studio's logo, etc.) can be used with many different primary content presentations, further saving encoding and storage resources.

The techniques described herein also allow for the synchronization of static secondary content prior to a playback request (i.e., static stitching), the synchronization of dynamic secondary content upon receipt of a playback request (i.e., dynamic stitching), and the potential re-synchronization of the static secondary content upon receipt of the playback request. An example may be instructive.

Figure 1B:
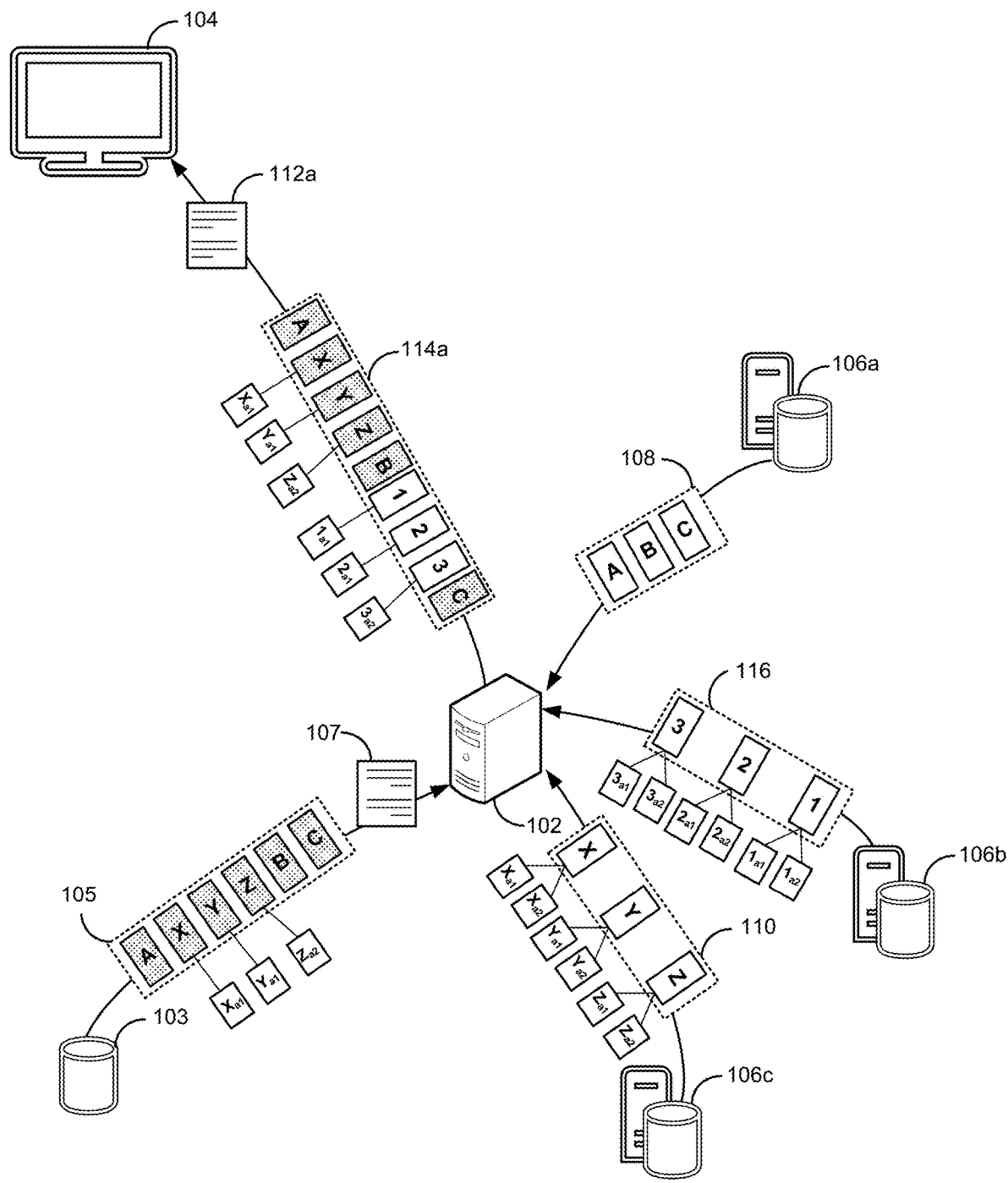
Figure 1C:
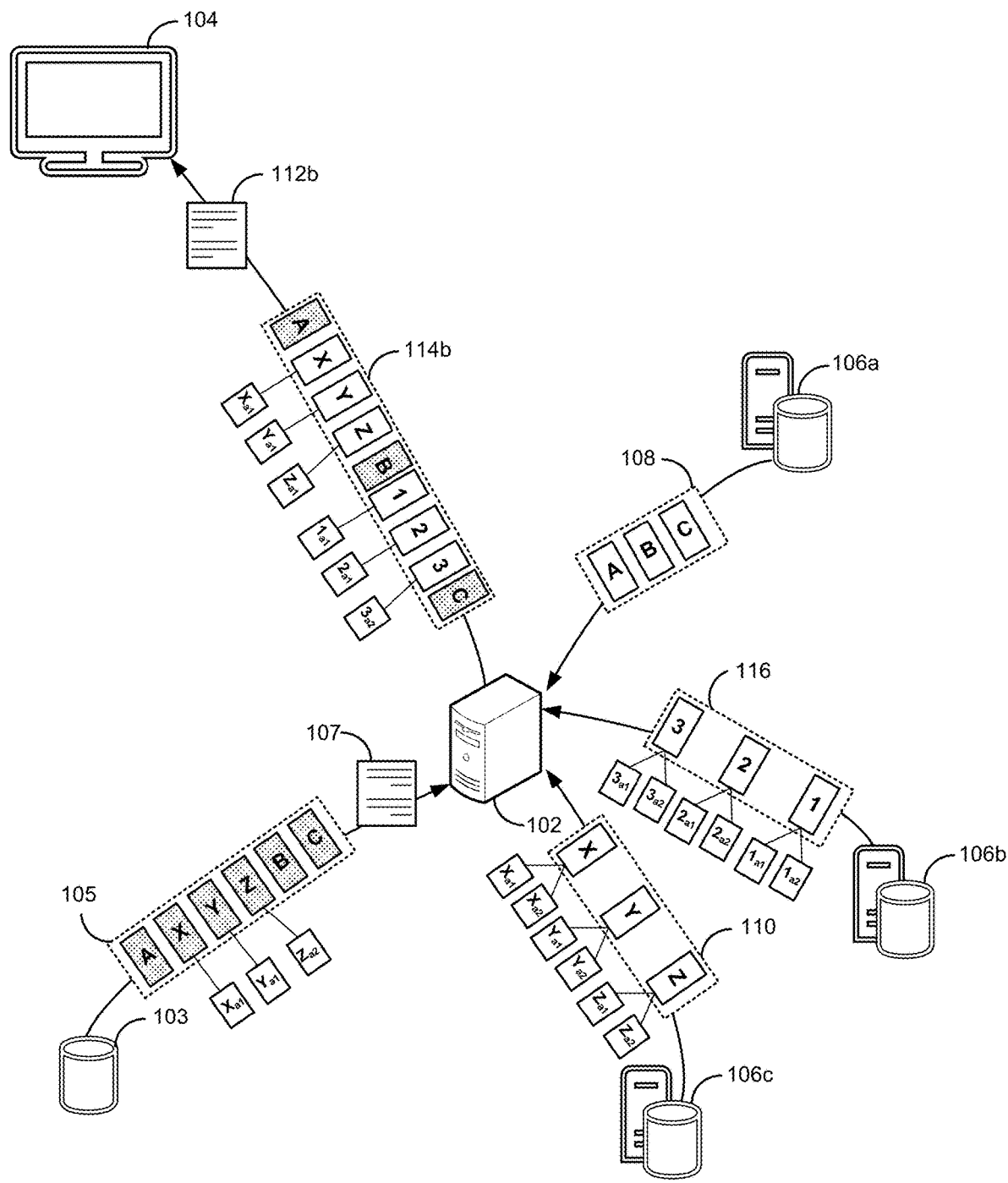

FIGS. 1A, 1B, and 1C illustrate an example of providing primary content with secondary content inserted using server-side fragment insertion techniques. Server-side fragment insertion techniques are also described in U.S. Pat. No. 10,313,722, issued Jun. 4, 2019, which is incorporated herein by reference in its entirety. To include secondary media content (e.g., an advertisement, studio logos, distributor logos, pre-roll media, post-roll media, additional credits, legal notices, etc.) with the primary media content, server-side fragment insertion techniques are used to generate manifest data for use by client device 104 in generating properly formatted requests for fragments of the content. In FIG. 1A, a media server ingests new primary media content (e.g., an episode of Divorce) from media server 102, ingests new static secondary media content (e.g., a set of production logos associated with the producers of Divorce), and prepares pre-stitched manifest data 107 as part of including the static secondary media content with the primary media content. In FIGS. 1B and 1C, client device 104 (e.g., a smart television (TV)) sends a request for playback of primary media content (e.g., an episode of Divorce) to media server 102 and the media server 102 prepares manifest data 112*a* or 112*b* as part of including dynamic secondary media content and the static secondary media content with the primary media content.

As shown at least in FIG. 1A, media server 102 may generate pre-stitched manifest data 107 upon addition of new primary media content and/or secondary media content into a media library of the media server 102. If desired, multiple versions of pre-stitched manifest data 107 may be generated for each primary media content within the media library of the media server 102. This may be particularly advantageous when it is desired to insert static secondary content, but where that static secondary content varies depending upon which user requests playback. As an example, it may be desired to generate a first version of the manifest data with references to a first legal warning before playback of the primary media content to users in a first country, and to generate a second version of the manifest data with references to a second legal warning before playback to users in a second country. If desired, pre-stitched manifest data 107 may also include references to dynamic secondary content (e.g., content that changes on a relatively regular basis, such as advertisements). The pre-stitched manifest data 107, which will be further described below, may be generated before any playback requests for the new media content are received. By creating pre-stitched manifest data 107, the resource requirements on the media server 102 upon receipt of a playback request can be reduced.

To generate pre-stitched manifest data 107 for a given piece of primary media content (e.g., an episode of Divorce), media server 102 may identify content (e.g., the Divorce media content) stored at origin server 106a. Media server 102 identifies and selects Divorce fragments 108 to be associated with a manifest identifier (e.g. a uniform resource locator (URL)). In addition, media server 102 identifies static secondary content fragments 110 from origin server 106c. In contrast to Divorce fragments 108, static secondary content fragments 110 include two versions of the audio fragments that refer to substantially similar segments of audio content. That is, one version of the audio fragments are unaltered audio fragments (e.g., a complete sampling pattern), and the other version of the audio fragments are audio fragments with a frame removed from the end. For example, the secondary content fragment Z includes a first version of the audio fragment that is 2.005 seconds long and a second version of the audio fragment that is 1.995 seconds long. For the sake of brevity and clarity, this disclosure will primarily use the term "non-drop version" to refer to unaltered audio fragment and "drop version" to refer to audio fragments with a frame removed.

As media server 102 selects static secondary content fragments to associate with the manifest identifier, media server 102 determines which version of the audio fragment should be used. Media server 102 identifies durations for video and audio fragments 110 (e.g., 6 seconds for the video fragments and 6.015 seconds for the audio fragments) if only non-drop audio fragments were used. Media server 102 then determines the potential delay between the audio and video during playback (e.g., 15 milliseconds). Finally, media server 102 determines whether the duration exceeds a threshold that represents when a user might perceive a lack of synchronization between audio and video during playback (e.g. 12.5 milliseconds). In this example, the duration exceeds the threshold, and as such, media server 102 selects non-drop versions of the audio fragments for fragments X and Y and selects the drop version of the audio fragment for fragment Z. Fragment selection continues in a similar manner for the remaining primary and secondary content to be added to the manifest identifier. After finishing the fragment selection process, media server 102 generates manifest identifier based on the selected fragments. In other words, media server 102 generates pre-stitched manifest data 107, which may be stored in server 103 (which may be part of media server 102).

Pre-stitched manifest data 107 includes references to fragments for both the primary content, i.e., Divorce, and the static secondary content, e.g., legal notices, pre-rolls, etc., with some static secondary content fragments being non-drop audio fragments (e.g., fragments X and Y) and other static secondary content fragments being drop version audio fragments with a frame or sample removed. Manifest data 107, if provided to a client device 104, could be used by client device 102 to request fragments 105 from media server 102. The delay between audio and video for fragments X and Y increases during playback on client device 104; however, because fragment Z includes a drop version of the audio fragment, when client device 104 requests the next fragment for Divorce (e.g., fragment B), there will be no noticeable delay between the audio and video by the user.

After media server 102 receives a playback request, the media server 102 can retrieve the pre-stitched manifest data 107 and perform further insertion of secondary content (e.g., to dynamic secondary content such as advertisements).

As shown in FIG. 1B, the process described above in connection with FIG. 1A for the insertion of static secondary content can, in some situations, be continued in order to insert the dynamic secondary content. In particular, media server 102 identifies and selects primary media content (i.e., Divorce) fragments 108, static secondary content fragments 110, and dynamic secondary content fragments 116 to be associated with a manifest identifier (e.g. a uniform resource locator (URL)). The dynamic secondary content fragments 116, like the static secondary content fragments 110, may include two versions of the audio fragments that refer to substantially similar segments of audio content (i.e., a "non-drop version" and a "drop version"). That is, one version of the audio fragments are unaltered audio fragments (e.g., a complete sampling pattern), and the other version of the audio fragments are audio fragments with a frame removed from the end. For example, the secondary content fragment 1 includes a first version of the audio fragment that is 2.005 seconds long and a second version of the audio fragment that is 1.995 seconds long.

As media server 102 selects dynamic secondary content fragments to associate with the manifest identifier, media server 102 determines whether the drop version or the non-drop version of the audio fragment should be used in order to keep potential delay between audio and video during playback less than the threshold. In the example of FIG. 1B, media server 102 selects non-drop versions of the audio fragments for fragments 1 and 2 and selects the drop version of the audio fragment for fragment 3. Fragment selection continues in a similar manner for the remaining primary and secondary content to be added to the manifest identifier. After finishing the fragment selection process, media server 102 generates manifest identifier based on the selected fragments and provides it to client device 104. Client device 104 uses the manifest identifier to request manifest data 112.

Manifest data 112a of FIG. 1B includes references to fragments for the primary content, i.e., Divorce; the static secondary content, i.e., studio logos; and the static secondary content, i.e., advertisements, with some static and/or dynamic secondary content fragments being non-drop audio fragments (e.g., fragments X, Y, 1, and 2) and other secondary content fragments being drop version audio fragments with a frame or sample removed. After receiving manifest data 112a, client device 104 uses manifest data 112a to request fragments 114a from media server 102. The delay between audio and video for fragments X and Y increases during playback on client device 104; however, because fragment Z includes a drop version of the audio fragment, when client device 104 requests the next fragment for Divorce (e.g., fragment B), there will be no noticeable delay between the audio and video by the user. Similarly, the delay between audio and video for fragments 1 and 2 increases during playback on client device 104; however, because fragment 3 includes a drop version of the audio fragment, when client device 104 requests the next fragment for Divorce (e.g., fragment 3), there will be no noticeable delay between the audio and video by the user.

In some situations, media server 102 may be unable to insert dynamic secondary content fragments while ensuring the duration (e.g., potential delay between the audio and video during playback) remains below the desired threshold. In particular, it is possible that selections of fragments (i.e., selections between drop versions or non-drop versions of fragments) made during generation of pre-stitched manifest data 107 might result in a situation that dynamic secondary content cannot be inserted without the duration exceeding the threshold. In such a situation, the media server may need to alter which version (e.g., drop or non-drop) was selected for one or more fragments 110 associated with static secondary media content. In other words, the media server 102 may need to at least partially re-do the insertion of the static secondary media content in order to insert dynamic secondary media content. Such an arrangement is illustrated in FIG. 1C, where the media server has replaced the selection of the drop-version of fragment Z with a selection of the non-drop version of fragment Z in order to maintain the duration under the threshold at all times during playback.

Figure 2:
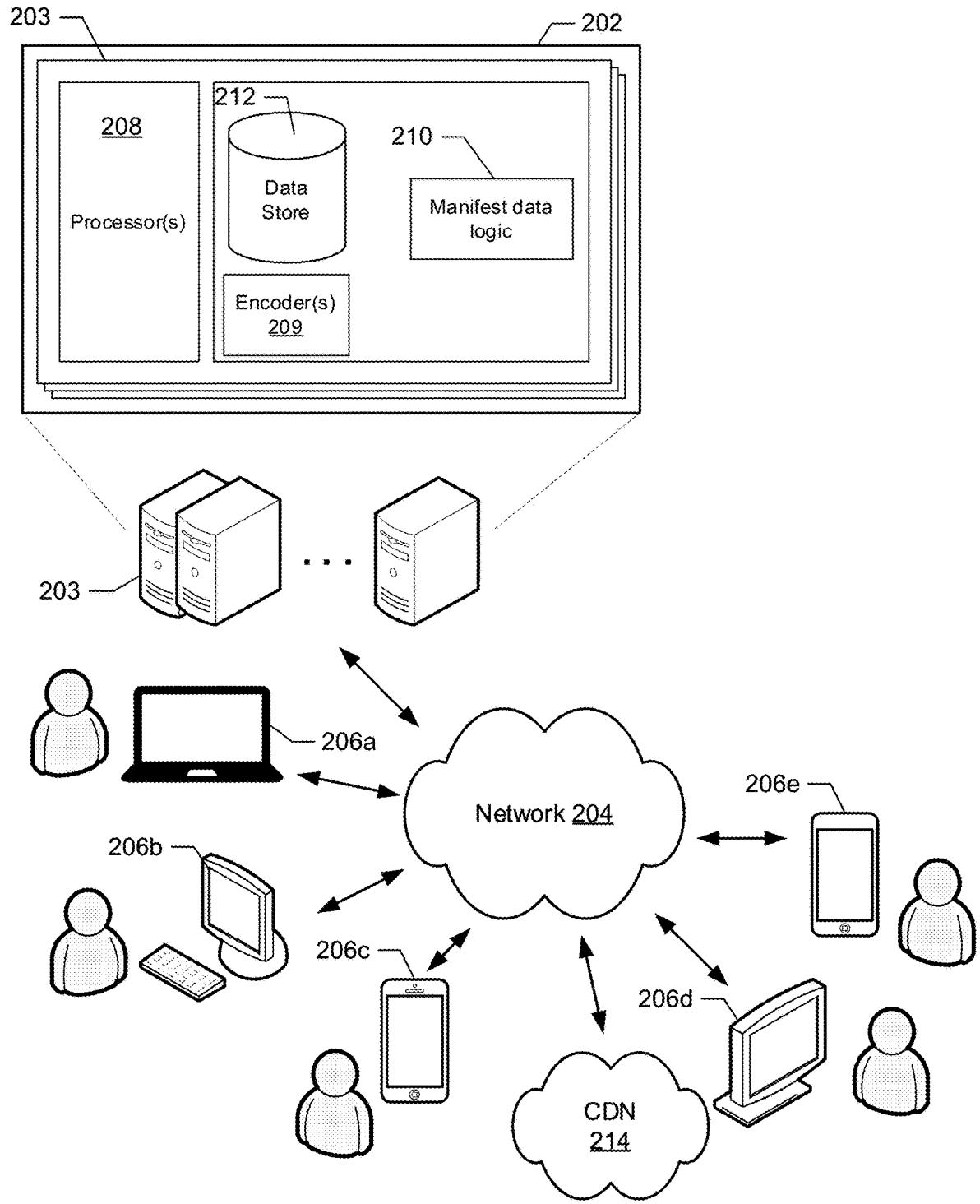
FIG. 2 is a simplified diagram of a computing environment in which various implementations may be practiced.

FIG. 2 illustrates an example of a computing environment in which a video content service 202 provides live streaming content and video-on-demand (VOD) content (e.g., audio or video) via network 204 to a variety of client devices (206a-e) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, HTTP networks, TCP/IP-based networks, telecommunications networks, wireless networks, satellite networks, cable networks, public networks, private networks, wide area networks, local area networks, the Internet, the World Wide Web, intranets, extranets, etc.

Client devices 206a-e may be any suitable device capable of connecting to network 204 for streaming on-demand and live streaming content provided by service 202. Such devices may include, for example, mobile devices (e.g., cell phones, smart phones, and tablets), personal computers (e.g., laptops and desktops), set top boxes (e.g., for cable, satellite, and online systems), smart televisions, gaming consoles, wearable computing devices (e.g., smart watches), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

Server 203 includes one or more processors 208, one or more encoders 209, one or more data stores 212, and other hardware and/or software components to encode media content and provide the encoded media content to client devices 206a-e. Server 203 may be implemented by a variety of physical servers and/or virtual servers. In some implementations, server 203 is partitioned to have several virtual servers configured to perform different functions. In one example, one virtual server identifies primary manifest data and secondary manifest data for generating manifest identifiers using fragment insertion techniques, while a second virtual server generates fragments for delivery to client devices 206a-e. Server 203 includes logic configured to identify and select primary content and secondary content and base the generation of corresponding manifest data on the selected content (e.g., as represented by manifest generation logic 210).

Encoder 209 encodes media content that it receives from content providers such as, for example, content service 202, a third party content provider, an advertisement exchange server, etc. Alternatively, an advertisement server encodes the secondary advertisement content and provides it to content service 202 of FIG. 2 for storage. Encoding parameters and/or profiles are used to encode and package fragments of media content at various bitrates. Primary content and secondary content may be encoded using similar encoding profiles, which allow for a seamless playback experience during transitions between the two types of content. Moreover, two versions of the secondary content can be generated (e.g., the drop version and the non-drop version). Content may be encoded using a variety of variable bitrate encoding techniques including single-pass encoding, multi-pass encoding, constrained variable bitrate encoding, content type variable bitrate encoding, and any other lossless and/or lossy encoding technique that meets an encoding standard (e.g., MPEG-2, H.264, HEVC/H.265, etc.). For example, client device 206a might receive fragments encoded at a bitrate of 3,200 kbps, and client device 206b might receive fragments encoded at a bitrate of 2,400 kbps. And depending on their network conditions might both begin to receive fragments at a bitrate of 3,200 kbps. After an encoding process, encoded fragments are stored in memory such as a local buffer for delivery to CDN 214 or to client devices 206a-e.

Manifest generation logic 210 can control the manner in which secondary fragments are included among primary fragments for manifest identifiers and manifest data. For example, secondary fragments can be included in pre-roll (before primary media content begins playback), mid-roll (during playback of primary media content), and post-roll locations (after primary media content completes playback). In some implementations, manifest data generation logic 210 uses predetermined cue points and durations associated with the primary content to insert secondary content fragments. In one example, a developer manually configures a manifest data template with predetermined cue points where advertisement fragments are to be inserted.

Manifest data generation logic 210 can use server-side fragment insertion techniques on a variety of types of manifest data, which depend on the type of adaptive bitrate streaming protocol used by the client device. Examples of adaptive bitrate streaming protocols include Microsoft Smooth Streaming, Dynamic Adaptive Streaming over HTTP (DASH), HTTP dynamic streaming, HTTP live streaming (HLS), etc. To illustrate, a smart TV with a media player using the DASH protocol will play back media content using manifest data that is particular to DASH, whereas another media player using the Smooth Streaming protocol will play back media content using manifest data particular to Smooth Streaming In some implementations, manifests are generated using an Extensible Markup Language (XML) formatted document, but could also be provided any other markup language, for example, javascript object notation (JSON).

In addition to providing access to media content, server 203 may also include a variety of information related to the media content (e.g., various types of metadata and manifest data in data store 212 to which service 202 provides access). Alternatively, such information about the media content, as well as the media content itself may be provided and/or hosted by one or more separate platforms or databases, e.g., CDN 214. CDN 214 may help facilitate distribution of media content through a variety of software, hardware, and network components to client devices according to geographic proximity. It should be noted that while logic 210 and data store 212 are contemplated as integrated with server 203 of content service 202, implementations are also contemplated in which either or both operate remotely from the associated content service, and/or either or both are under the control of an independent entity. From these examples, those of skill in the art will understand the diversity of use cases to which the techniques described herein are applicable.

Client devices 206a-e can also include various types of logic, for instance, decoder logic for decoding the encoded media content received from edge server 204a and playback handling logic to request playback of portions of media content. In addition, client devices 206a-e includes various types of memory to store and/or cache decoded media, one or more processors, and other hardware components to request and decode the encoded media content provided by server 203. For example, the processors of client devices 206a-e execute stored instructions in memory to implement decoding and content retrieval techniques to acquire and play back content provided in accordance with the techniques disclosed herein. In addition, client devices 206a-e may communicate with server 203 through different types of network protocols such as a stateful connection, e.g., a physical socket connection between server and client, or using a stateless connection, for instance, using the Hypertext Transfer Protocol (HTTP).

It should be noted that, despite references to particular computing paradigms and software tools herein, the computer program product and the computer program instructions on which various implementations disclosed herein are based may correspond to any of a wide variety of programming languages, software tools, and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Figure 3A:
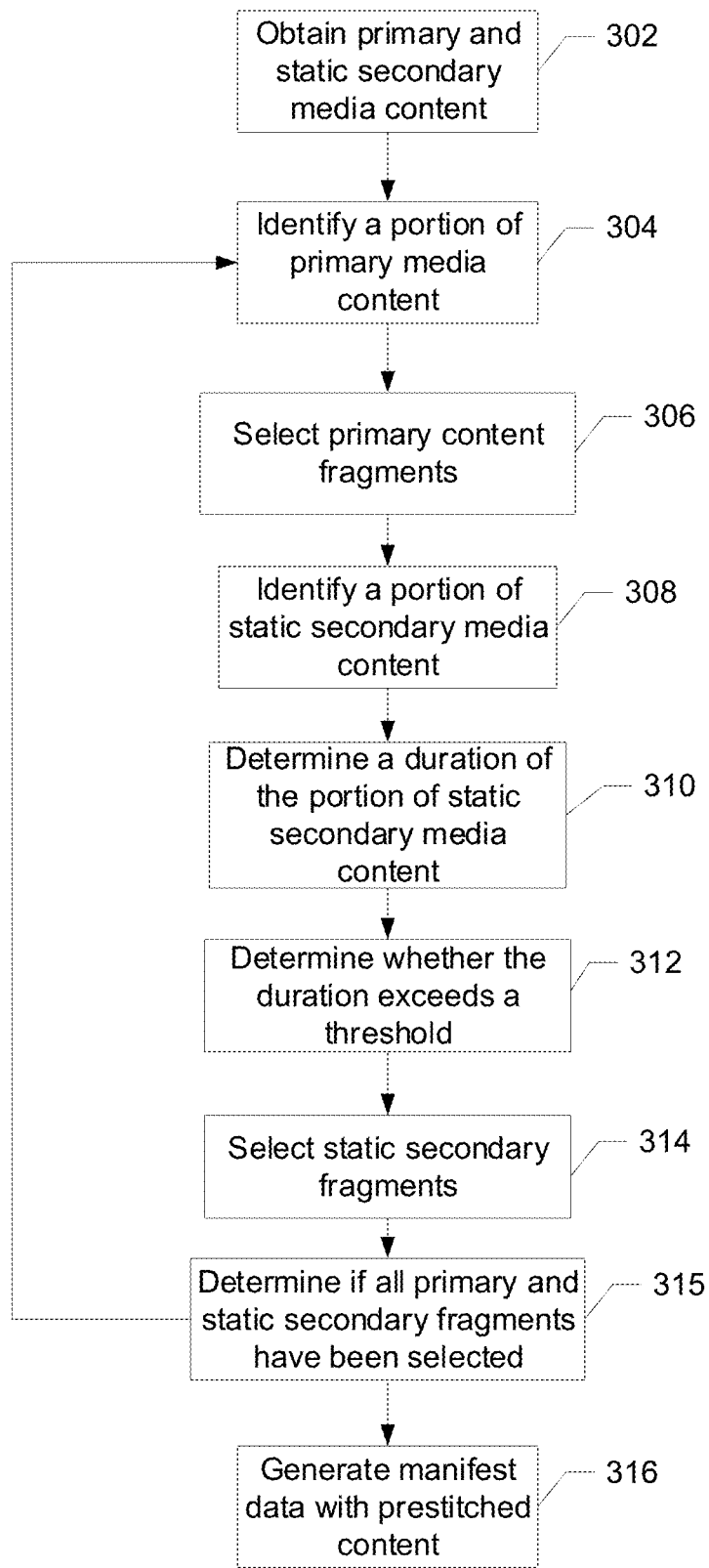
FIGS. 3A and 3B are flowcharts illustrating operation of a particular implementation.
Figure 3B:
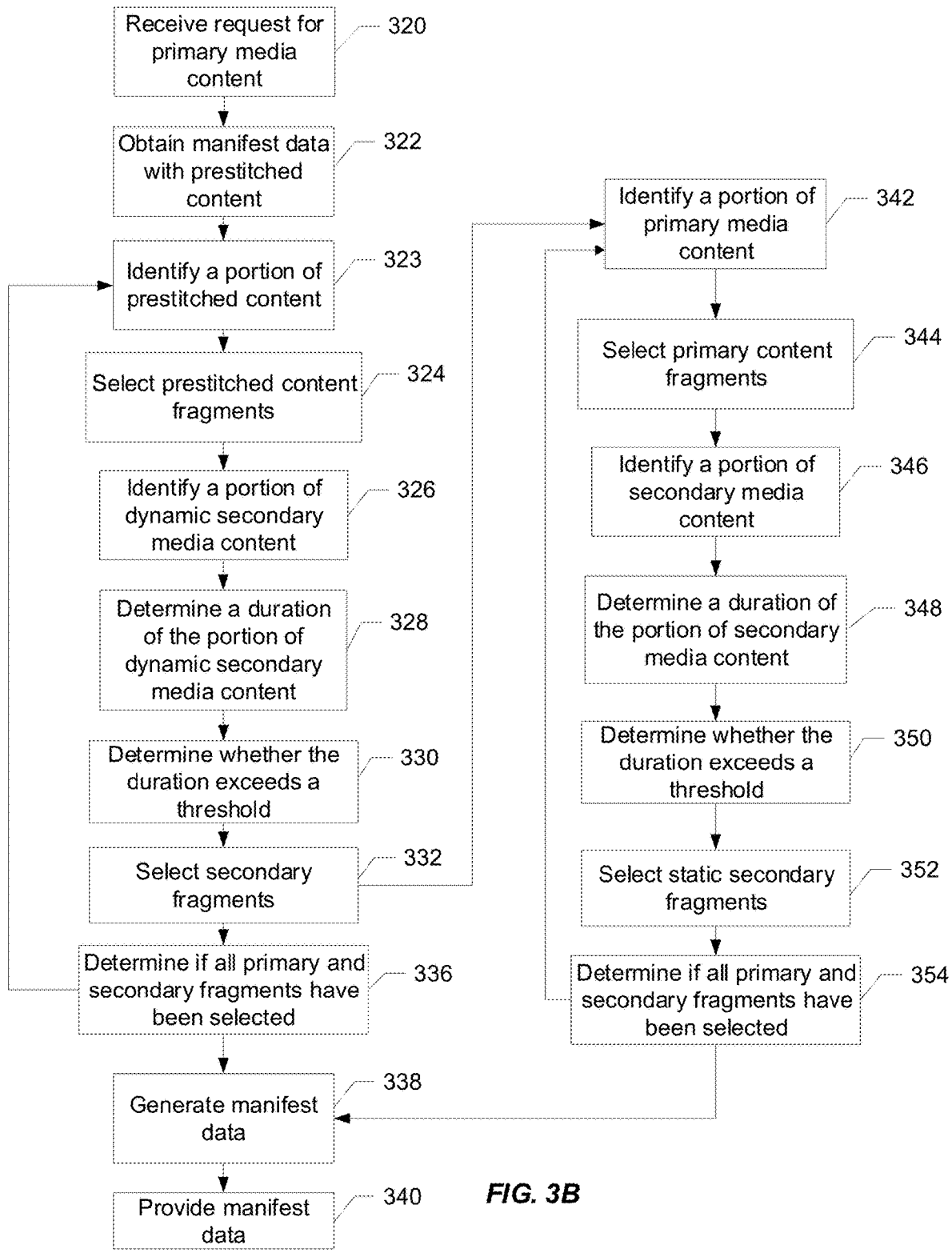

A specific implementation will now be described with reference to FIGS. 1A, 1B, and 1C; the computing environment of FIG. 2; and the flow diagrams of FIGS. 3A and 3B. FIG. 3A sets forth a flow for generating manifest data with inserted static secondary content. The flow of FIG. 3A can be performed at any time (e.g., before a playback request is received from a client device). FIG. 3B sets forth a flow for inserting dynamic secondary content into the previously generated manifest data (having already-inserted static secondary content) and, under certain situations, re-doing the insertion of the static secondary content.

A media server such as media server 102 of FIG. 1A may obtain primary and static secondary media content, such as an episode of Divorce and associated static secondary media content such as studio logos associated with that episode of Divorce (302). The media server begins the process of generating manifest data using server-side fragment insertion techniques by identifying an initial portion of primary media content (304). The initial portion of primary media content can refer to any length and/or segment of media content (a few seconds, minutes, etc.) before static secondary content is to be included. For example, media server 102 identifies the first 16 seconds of Divorce at origin server 106a.

Next, primary content fragments for the portion of primary media content are identified (306). For example, media server 102 identifies and selects Divorce fragments 108. In contrast to the secondary content fragments discussed below, media server 102 selects from among primary content fragments that have only one version for the video and audio fragments at each of the different available bit rates (e.g., the non-drop version). Manifest data and/or manifest identifiers can be generated based on a combination of primary content manifest data and secondary content manifest data (or source manifest data). For example, media server 102 identifies primary content manifest data for Divorce. The primary content manifest data might be, for example, a standard VOD manifest without secondary content inserted. In some implementations, a media server uses a dynamic manifest template that includes a predetermined order for where primary content fragments and secondary content fragments are to be inserted. Using the example above, media server 102 identifies 8 fragments (representing the initial 16 seconds of Divorce) from the primary content manifest and includes the references in the dynamic manifest.

Primary content fragments can be encoded using a substantially similar encoding profile as the secondary content fragments, allowing for a similar visual and audio experience during playback of both types of fragments. In particular, the encoding profile can use the same audio codec, audio channels, audio sample rate, video codec, some or all the bitrates of the feature fragments, frame rate, video bit depth, color space, display aspect ratio, etc. By encoding both types of fragments using substantially similar encoding profiles, transition between primary content and secondary content can appear like a seamless transition for the user. One difference (discussed in more detail below) between the encoding profiles is that the secondary content fragments include two versions of the secondary content audio fragments at each bit rate.

Media server 102 of FIG. 1 identifies an initial portion of static secondary media content (308). The portion of secondary content can refer to a single fragment, all the secondary content fragments for a particular piece of static secondary content, or all the static secondary content fragments for all of the static secondary content to be associated with the manifest data. For example, media server 102 identifies 6 seconds of a studio logo pre-roll, which might be located at a different origin server than the primary media content, for instance, origin server 106c. In some implementations, origin servers are controlled by different providers. For example, the primary content might be handled by an origin server controlled by content service 202 of FIG. 2 while an advertisement exchange server controls the dynamic secondary media content (e.g., advertisements) and an additional server controls static secondary media content. An advertisement server provides advertisement content from an advertiser that successfully bids for the advertisement slot, where the advertisement content might be personally tailored to the viewing habits of a user of client device 104 of FIG. 1 (e.g., a user watching Divorce might tend to interested in Game of Thrones). The additional server may provide static secondary media content from one or more sources. The static secondary media content might be tailored for particularly jurisdictions (e.g., a different set of static secondary media content might be included depending on the country in which a user's playback device is located). As an example, a legal warning required by a given country may be inserted for playback devices within that country, but not for playback devices outside that country.

Media server 102 determines a duration based on the portion of secondary media content identified in block 308 (310). The duration is used in conjunction with block 312 (discussed below) to determine which version of the audio fragment should be used. In some implementations, video fragments are pre-configured to be encoded at two second intervals, and as such, a media server would only need to determine a duration for the audio fragments, which have variable lengths depending on the audio sampling pattern used (discussed further below). For example, if 3 audio fragments have a duration of 6.015 seconds, duration determination logic could be configured to infer that the 6.015 duration for the audio fragments corresponds to a 6 second duration for the video fragments. In other implementations, a media server identifies durations for both video and audio fragments. For example, 6 seconds for the video fragments and 6.015 seconds for the audio fragments if only non-drop audio fragments were used.

Audio fragments may follow a variety of audio sampling patterns. The type of audio pattern may depend on the choice of audio codec. Examples of audio codecs include mp4a.40.5 AACHE, mp4a.40.29 AACHEv2, mp4a.40.2 AACLC, ec3, etc. Examples of sample rates include 24 kHz, 48 kHz, 96 kHz, etc. Depending on the codec used, an audio pattern may complete the pattern in a single fragment or the pattern may extend across multiple fragments. For example, using the ec-3 codec with a sample rate of 48 kHz an audio pattern is completed after two fragments. In another example, using the mp4a.40.2 AACLC codec with a sample rate of 48 kHz an audio pattern is completed after four fragments. In one more example, using the mp4a.40.5 AACHE codec with a sample rate of 24 kHz an audio pattern is completed after eight fragments.

In some implementations, a media server tracks a duration for secondary content audio fragments across periods of secondary content. For example, an initial portion of secondary content fragments includes 6.015 seconds of audio fragments. When the media server repeats the determination of the duration of the next portion of secondary media content, it uses the 6.015 seconds as the starting time to be incremented based on the new duration determination. For example, if the next portion of secondary media content also includes 6.015 seconds of audio fragments, then the total duration would be 12.03. Alternatively, a total duration might also include durations of the primary audio content fragments. For example, there might be six seconds of primary content audio fragments in between the first group of secondary content audio fragments and the second group of secondary content audio fragments for a total duration of 18.03 at the end of the second group of secondary content audio fragments.

In some implementations, the actual duration of the primary content audio fragments is not used as part of the duration determination. The reason being that just like secondary content audio fragments, primary content audio fragments use audio sampling techniques that do not always align exactly with fixed two-second intervals. However, this does not create an issue with synchronization between audio and video because if the last primary content audio fragment delivered before a section of secondary media content begins and the sampling pattern for the primary content audio fragment had not completed, the first primary audio content fragment delivered at the end of the secondary media content will pick up the sampling pattern where the previous primary content audio fragment left off and complete the sampling pattern. As such, the duration used for the primary content audio fragments can be based on the actual duration of the primary content video fragments (e.g., 2 seconds multiplied by 3 fragments is 6 seconds).

Returning to FIG. 3A, media server 102 determines whether the duration determined in block 310 exceeds a threshold (312). A threshold can be any numerical value and typically represents an amount of delay beyond which a user might begin to perceive the lack of synchronization between audio and video during playback. In some cases, the threshold is 12.5 milliseconds, but the threshold might be any other amount of time that results in a perceived lack of synchronization between audio and video or lip sync error. For example, a threshold may be set anywhere between 5-45 milliseconds. In some implementations, there is an upper threshold and a lower threshold. In some cases, the upper and lower threshold values may be the same distance from exact alignment, for instance, 22 milliseconds for the upper threshold and −22 milliseconds for the lower threshold. In other cases, the upper and lower threshold values may be different because a user typically does not notice lack of synchronization as easily when the video is ahead of the audio. Examples include 15 milliseconds for an upper threshold and −45 milliseconds for a lower threshold and 45 milliseconds for an upper threshold and −125 milliseconds for a lower threshold.

As used herein, the term "exceed" can refer to a measurement where a value is substantially equal to (e.g., ±1-2 milliseconds), or above for an upper threshold, or below for a lower threshold another value representing the threshold. Alternatively, the term "exceed" can refer to a measurement where the absolute value of a duration is substantially equal to (e.g., ±1-2 milliseconds) an absolute value of a threshold or the absolute value of the duration exceeds the absolute value of the threshold. If a duration does not exceed a threshold, then a media server will select non-drop versions for each secondary content audio fragment in a period of secondary content. If the duration exceeds the threshold, then a media server will select non-drop versions for each secondary content audio fragment except the last fragment, for which the media server selects the drop version. When selecting secondary content audio fragments after the determination of block 310, by selecting a drop version of one of the secondary content audio fragments, the delay between the audio and video is reduced to a value below the threshold.

In FIG. 3A, depending on the determination of block 312, media server 102 selects secondary content fragments (314). The selection process of block 314 includes selecting between different versions of the secondary content fragments. A non-drop version of an audio content fragment will increase the delay between the audio and video, and a drop version of the audio content fragment will reduce the delay between the audio and video. The number of frames in a fragment and the length of each frame can be determined using the duration of an audio fragment, the number of audio samples per frame, and the sample rate. For example, the equation is $$\frac{\text{Duration of an audio fragment}}{\frac{\text{Audio samples per frame}}{\text{Sample rate}}} = \text{Number of frames per fragment}$$

To illustrate using the mp4a.40.2 AACLC codec (e.g. 2.0053 seconds for non-drop fragments) with a sample rate of 48 kHz and 1024 samples per frame the equation is $$\frac{2.0053 \text{ seconds}}{\frac{1024 \text{ samples per frame}}{48 \text{ kHz}}} = 94 \text{ frames.}$$

If one frame is removed as part of creating a dropped version of an audio content fragment, then the dropped version of the audio content has 93 frames resulting in $$\frac{1024 \text{ samples per frame}}{48 \text{ kHz}} \times 93 = 1.984 \text{ seconds.}$$

In a simplified example, before interrupting the primary content with secondary content, the total delay before beginning the secondary content is 10 milliseconds. The duration of the non-drop version of the secondary content audio fragments is 10.01, and as such, media server 102 will select a drop version for the last secondary content audio fragment because if the media server selected only non-drop audio fragments, there would be 20 milliseconds of delay between the audio and video. By selecting a drop version for the last audio content fragment (with one frame of 10 milliseconds removed), the total delay at the end of the advertisement is approximately 0.

In some embodiments, media server 102 may select, as part of block 314, secondary content fragments for a particular portion of a media presentation based on information about subsequent content within the media presentation. In particular, if a later-appearing portion of a media presentation includes segments that skew the audio-visual synchronization such that the audio leads the video, media server 102 may select secondary fragments in 314 that skew towards having the audio follow the video in anticipation of the later-appearing segments (e.g., such that the skews of the two segments at least partially offset and/or that the audio-visual sync remains within a desired threshold at some or all times of the media presentation). A forward-looking analysis of this type may be particularly beneficial where content has been previously inserted (e.g., as part of blocks 332 and/or 352). In particular, while the audio-video sync threshold may have been satisfied at the time of inserting static secondary content, decisions made while inserting earlier-appearing dynamic secondary content could, in theory, push the audio-video sync threshold out of the desired range for the later-appearing static secondary content. Thus, it may be beneficial to consider how decisions made in block 314 impact subsequent portions of the media presentation.

As mentioned above, secondary content fragments can be encoded using a substantially similar encoding profile as the primary content fragments. While media server 102 uses a standard VOD manifest for selecting the primary content fragments, media server 102 can select secondary fragments according to different types of manifest data. In some implementations, secondary manifest data is similar to a standard VOD manifest except that it includes a drop version and a non-drop version of each fragment. For example, there would be one secondary content manifest for the Game of Thrones secondary content (e.g., an extra set of credits for a version dubbed into a foreign language, etc.). In another example, the secondary content manifest includes references for Game of Thrones and every other item of static secondary content that might be inserted using server-side fragment insertion techniques. In another implementation, secondary content manifests are created for each audio sampling pattern. The number of secondary content manifests for one item of secondary content can be large, e.g., using the equation of $2^{x \text{ distinct audio patterns}} \times y$ unique items of secondary content=total number of secondary content manifests. Using the audio patterns mentioned above and assuming that there are 70 different items of secondary content, the number of secondary content manifests is $2^3 \times 70$, or 560 secondary content manifests.

In some implementations, the blocks 304-314 iterate as necessary until all of the primary and secondary fragments have been selected. As an example, media server 102 can, in block 315, determine if all primary content and static secondary content fragments have been selected. If fragments remain to be selected, media server 102 returns to block 304 (e.g., reiterate blocks 304-314). If no fragments remain to be selected, media server 102 progresses to block 316. In block 316, manifest data is generated based on the fragments selected. In some implementations, the manifest data is an encoded URL that includes a secondary content identifier, a start time of the secondary content fragments, a length of the secondary content fragments, and an indication of an audio version for each item of static secondary content to be included with playback of the primary content. An example of a URL with one item of static secondary content is "example.cdn.net/GOT.ism/SecondaryStart(12 seconds)/SecondaryLength(10 seconds)/SecondaryID(studiologo1)AudioVersion(nondrop)." In another example, a URL with two items of static secondary content is "example.cdn.net/GOT.ism/SecondaryStart(12 seconds)/SecondaryLength(10 seconds)/SecondaryID(studiologo1)AudioVersion(non-drop)/SecondaryStart(40 seconds)/SecondaryLength(10 seconds)/SecodnaryID(studiologo2)AudioVersion(drop)."

After a client device requests playback using the encoded URL, manifest data is generated based on the encoded URL. For example, the secondary content information from the URL can be used to insert references to the secondary content fragments between portions of primary content fragments when the manifest data is generated. Using the URL example with two items of secondary content, the sequence of fragments in the manifest data starts with references to 6 primary content fragments, followed by 5 secondary content fragments (with non-drop version audio fragments), returns to 8 primary content fragments, and finishes with 5 secondary content fragments (with drop version audio fragments). Alternatively, the manifest data can be generated based on the secondary content fragments without using the encoded URL. For example, inserting references directly into manifest data based on secondary content manifests implemented as described further above where a secondary content manifest is created for each audio sampling pattern and each advertisement.

In some embodiments, additional secondary content fragments may be stitched into the manifest data and/or previously-stitched secondary content fragments may be removed from the manifest data (e.g., even after manifest data is generated in block 316). In such embodiments, blocks 302-315 may be repeated as necessary to stitch in additional secondary content fragments and/or remove previously-stitched secondary content fragments. Such arrangements may be particularly useful if the desired set of static secondary content changes over time. The insertion of additional secondary content fragments and/or the removal of previously-inserted secondary content fragments may occur after one or more users has requested the associated primary media content (e.g., after block 320).

A simplified example of manifest data is shown in FIG. 4. As shown in FIG. 4 manifest data 402 includes references to audio fragments at a variety of bitrates (e.g., 128 kbps, 64 kbps, and 32 kbps). Manifest data 402 also includes references to audio fragments associated with primary content (e.g., fragments A, B, C, and D) and references to audio fragments associated with secondary content (e.g., fragments X, Y, and Z). Each fragment includes an index or time range (e.g., Time range=0 minutes 0 seconds to 0 minutes 5 seconds) and a location of the fragment (e.g., Location=\Media\Movies\A093b2b_1.isma). It should be noted that in manifest data 402 fragments X, Y, and Z include additional information about the version of the audio fragment. For example, the references for fragment X and Y indicate that upon their request, a client device will receive a non-drop version of the secondary content audio fragment. However, the reference to fragment Z indicates that upon request, a client device will receive a drop version of the secondary content audio fragment. In some implementations, this information is encoded in an identifier included in a fragment request to an edge server of a CDN. The manner in which an audio version is represented may vary, for instance, as a bit encoded using a predefined binary protocol, the value returned after the threshold determination, or a relative value based on the durations of the preceding secondary content fragments, etc. Other information included as part of a request includes a protocol specification, an edge server location, a quality level, a media content type, an index of the fragment, and a length of the fragment, etc.

The manifest data generated in the flow of FIG. 3A may include references to primary media content and static secondary media content, but may still be missing references to dynamic secondary media content. Because dynamic secondary media content varies relatively frequently, it may be desirable not to generate manifest data including references to dynamic secondary med content until request for playback is received from a client device. The insertion of dynamic secondary media content is illustrated in the flow of FIG. 3B.

As shown in FIG. 3B, a client device (e.g., client device 104 of FIG. 1) sends a request for media content that is received by a media server such as media server 102 of FIG. 1 (320). A request for playback can be sent after a user selects an episode of Divorce through their smart TV, triggering the request for playback. In some implementations, the request of block 302 is received by an edge server of a CDN, which determines whether a cached copy of the manifest data exists locally before routing a request to a manifest service that may be controlled by a different service provider (e.g., content service 202 of FIG. 2).

In response to the request for playback, media server 102 obtains manifest data with pre-stitched content (e.g., already-inserted static secondary content) (322). Media server 102 then begins the process of generating manifest data with inserted dynamic secondary content, using the server-side fragment insertion techniques described above in connection with FIG. 3A. In particular, media server then performs blocks 323-340. It should be noted that each of blocks 323, 324, 326, 328, 330, 332, and 336, while related to dynamic secondary content rather that static secondary content, is functionally equivalent its equivalent blocks 304, 306, 308, 310, 312, 314, and 315. In other words, the discussion above in connection with the insertion of static secondary content applies equally to the blocks 323, 324, 326, 328, 330, 332, and 336 associated with the insertion of dynamic secondary content (e.g., advertisements). Thus, discussion of these blocks is omitted to avoid duplicative disclosure.

As previously noted, media server 102 may be unable, in some situations, to insert dynamic secondary content fragments while ensuring the duration (e.g., potential delay between the audio and video during playback) remains below the desired threshold, due to decisions made during the insertion of static secondary content fragments. As an example, media server 102 may determine, while performing block 332 (the counterpart to block 314), that none of the available versions of the secondary content audio fragment would yield a duration lower than the threshold. In other words, media server 102 may not be able to maintain the delay between audio and video to a desired level. In such a situation, media server 102 may need to undo at least one selection made during the insertion of static secondary content. In such situations, media server 102 may stop iterations of blocks 323-336 and move to block 342, where the primary content, the static secondary content, and the dynamic secondary content are stitched together from scratch (e.g., without using the pre-stitched manifest data generated in the flow of FIG. 3a). Media server 102 may also move to block 342 (e.g., re-stitch the content) upon detection that an audio-video sync at some point in the media presentation exceeds a desired threshold. If desired, media server 102 may re-analyze the media presentation (e.g., looking at audio-video sync at each boundary between segments, whether those are primary fragments, static secondary fragments, or dynamic secondary fragments) one or more times while performing the operations of FIG. 3B. As an example, block 332 and/or block 336 may involve verifying that audio-video sync remains below a desired threshold for all segments of the presentation and may move to block 342 if the audio-video sync at any segment boundary is determined to exceed the desired threshold (in a manner that cannot be corrected via selecting between drop and non-drop versions as taught herein). Blocks 342, 344, 346, 348, 350, 352, and 354 are functionally equivalent to blocks 304, 306, 308, 310, 312, 314, and 315, albeit involving insertion of both static secondary media and dynamic secondary media. Thus, discussion of these blocks is omitted to avoid duplicative disclosure.

In block 338, manifest data is generated based on the fragments selected (in block 332 for the dynamic secondary content and in block 314 for the static secondary content). In some implementations, the manifest data is an encoded URL that includes a secondary content identifier, a start time of the secondary content fragments, a length of the secondary content fragments, and an indication of an audio version for each item of static secondary content to be included with playback of the primary content. Further details of generating manifest data are discussed above in connection with FIG. 3 and are not repeated here for the sake of brevity.

In some embodiments, additional secondary content fragments may be stitched into the manifest data and/or previously-stitched secondary content fragments may be removed from the manifest data (e.g., even after manifest data is generated in block 338). In such embodiments, blocks 322-336 and/or blocks 342-354 may be repeated as necessary to stitch in additional secondary content fragments and/or remove previously-stitched secondary content fragments. Such arrangements may useful if the dynamic secondary content changes. The insertion of additional secondary content fragments and/or the removal of previously-inserted secondary content fragments may occur after one or more users has requested the associated primary media content (e.g., after block 320).

Returning to FIG. 3B, the manifest data is provided to the client device of block 320 (340). The client device then requests manifest data using the manifest identifier or fragments using the manifest data. In order to determine whether a fragment request is for a primary content fragment or a secondary content fragment, an edge server uses the additional data added to a URL included in the fragment request (e.g., a location identifier, the start time, a fragment identifier, etc.). In addition, if the request is for a secondary content fragment, the edge server further determines which version of the secondary content audio fragment should be provided. This determination can be based on a bit included in the fragment identifier that indicates whether the request is for a non-drop version of drop version of the secondary content audio fragment.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A system, comprising one or more processors and memory configured to:
before receiving a request for playback of primary media content, identify a first portion of the primary media content;
before receiving the request, select a first set of primary media fragments associated with the first portion of the primary media content;
before receiving the request, identify a portion of secondary media content, wherein the secondary media content comprises at least one of: a studio logo, a production company logo, a legal notice, additional credits, pre-roll media, and post-roll media and wherein the secondary media content has first version audio fragments and second version audio fragments associated therewith, the second version audio fragments corresponding to the first version audio fragments and including fewer frames of audio content than the corresponding first version audio fragments;
before receiving the request, determine a first duration based on the portion of the secondary media content, the first duration representing a potential delay between audio and video during playback;
before receiving the request, determine that the first duration is below a threshold, the threshold representing a value at which lack of synchronization between audio and video is perceivable by a user;
before receiving the request, select a set of secondary media content fragments associated with the portion of the secondary media content, the set of secondary media content fragments including the first version audio fragments;
before receiving the request, identify a second portion of the primary media content;
before receiving the request, select a second set of primary media fragments associated with the second portion of the primary media content;
receive the request for playback of the primary media content, the request originating from a client device;
after receiving the request, identify a portion of advertisement media content, wherein the advertisement media content has first version audio fragments and second version audio fragments associated therewith, the second version audio fragments corresponding to the first version audio fragments and including fewer frames of audio content than the corresponding first version audio fragments;
after receiving the request, identify a second duration based on the portion of the secondary media content and the portion of the advertisement media content;
after receiving the request, determine that the second duration exceeds the threshold;
after receiving the request, select a set of advertisement media fragments associated with the portion of the advertisement media content, the set of advertisement media fragments including the first version audio fragments and at least one of the second version audio fragments; and
after receiving the request, generate a manifest uniform resource locator including a first index associated with the set of secondary media content fragments and a second index associated with the set of advertisement media fragments.

2. The system of claim 1, wherein the threshold represents a synchronization difference between about 10 milliseconds and about 130 milliseconds.

3. The system of claim 1, wherein the threshold represents a synchronization difference in a range between negative 45 milliseconds and positive 125 milliseconds, where a positive synchronization difference indicates the audio lagging the video during playback and a negative synchronization difference indicates the video lagging the audio during playback.

4. The system of claim 1, wherein the second version of the audio fragments of the secondary media content includes one less frame of audio content than the first version of the audio fragments and wherein the second version of the audio fragments of the advertisement media content includes one less frame of audio content than the first version of the audio fragments.

5. The system of claim 1, wherein the one or more processors and memory are further configured to send the manifest uniform resource locator to the client device.

6. A system, comprising one or more processors and memory configured to:
identify a portion of first media content;
select first media fragments associated with the portion of the first media content;
identify a portion of second media content, the second media content having first version audio fragments and second version audio fragments associated therewith, the second version audio fragments corresponding to the first version audio fragments and including fewer media frames than the first version audio fragments;
determine a first duration based on the portion of the second media content, the first duration representing a potential delay between audio and video during playback;
select second media fragments associated with the portion of the second media content, wherein a first fraction of the selected second media fragments include the first version audio fragments, wherein a second fraction of the selected second media fragments include the second version audio fragments, and wherein the first and second fractions are determined based on the first duration;
receive a request for playback of the first media content;
at least partly based on receiving the request, identify an additional portion of the first media content;
at least partly based on receiving the request, select additional first media fragments associated with the additional portion of the first media content;
at least partly based on receiving the request, identify an additional portion of the second media content;
at least partly based on receiving the request, determine a second duration based on the portion of the second media content and the additional portion of the second media content;
at least partly based on receiving the request, select additional second media fragments associated with the additional portion of the second media content, wherein a third fraction of the selected additional second media fragments include the first version audio fragments, wherein a fourth fraction of the selected additional second media fragments include the second version audio fragments, and wherein the third and fourth fractions are determined based on the second duration; and
generate client manifest data, the client manifest data including references to the first media fragments, an index associated with the second media fragments, and an additional index associated with the additional second media fragments.

7. The system of claim 6, wherein the one or more processors and memory are further configured to:
re-determine the first duration based on the portion of the second media content, as part of selecting the additional second media fragments associated with the additional portion of the second media content; and
re-select second media fragments associated with the portion of the second media content, as part of selecting the additional second media fragments associated with the additional portion of the second media content.

8. The system of claim 6, wherein the first fraction is 100% and the second fraction is 0% such that the selected second media fragments include only the first version audio fragments.

9. The system of claim 6, wherein the first fraction is less than 100% and the second fraction is greater than 0% such that the selected second media fragments include a plurality of the first version audio fragments and at least one of the second version audio fragments.

10. The system of claim 6, wherein the client manifest data is a manifest identifier, wherein the index associated with the second media fragments includes at least one of: a secondary content identifier, a start time of the second media fragments, a length of the second media fragments, or an indication of an audio version of the second media fragments, and wherein the additional index associated with the additional second media fragments includes at least one of: an additional secondary content identifier, a start time of the additional second media fragments, a length of the additional second media fragments, or an indication of an audio version of the additional second media fragments.

11. The system of claim 6, wherein the second version audio fragments of the second media content include one less frame of audio content than the first version audio fragments of the second media content and wherein the second version of the audio fragments of the second media content include one less frame of audio content than the first version of the audio fragments.

12. The system of claim 6, wherein the one or more processors and memory are further configured to:
after receiving the request, identify a portion of third media content, the third media content having first version audio fragments and second version audio fragments associated therewith, the second version audio fragments corresponding to the first version audio fragments and including fewer media frames than the first version audio fragments;
determine a third duration based on the portion of the third media content, the first duration representing a potential delay between audio and video during playback;
select third media fragments associated with the portion of the third media content, wherein a first fraction of the selected third media fragments include the first version audio fragments, wherein a second fraction of the selected third media fragments include the second version audio fragments, and wherein the first and second fractions are determined based on the third duration;
receive an additional request for playback of the first media content; and
at least partly based on the additional request, generate additional client manifest data, the additional client manifest data including references to the first media fragments and indices associated with the second media fragments, the additional second media fragments, and the third media fragments.

13. A method, comprising:
identifying a portion of first media content;
selecting first media fragments associated with the portion of the first media content;
identifying a portion of second media content, the second media content having first version audio fragments and second version audio fragments associated therewith, the second version audio fragments corresponding to the first version audio fragments and including fewer media frames than the first version audio fragments;
determining a first duration based on the portion of the second media content, the first duration representing a potential delay between audio and video during playback;

selecting second media fragments associated with the portion of the second media content, wherein a first fraction of the selected second media fragments include the first version audio fragments, wherein a second fraction of the selected second media fragments include the second version audio fragments, and wherein the first and second fractions are determined based on the first duration;

receiving a request for playback of the first media content;

at least partly based on receiving the request, identifying an additional portion of the first media content;

at least partly based on receiving the request, selecting additional first media fragments associated with the additional portion of the first media content;

at least partly based on receiving the request, identifying an additional portion of the second media content;

at least partly based on receiving the request, determining a second duration based on the portion of the second media content and the additional portion of the second media content;

at least partly based on receiving the request, selecting additional second media fragments associated with the additional portion of the second media content, wherein a third fraction of the selected additional second media fragments include the first version audio fragments, wherein a fourth fraction of the selected additional second media fragments include the second version audio fragments, and wherein the third and fourth fractions are determined based on the second duration; and generating client manifest data, the client manifest data including references to the first media fragments, an index associated with the second media fragments, and an additional index associated with the additional second media fragments.

14. The method of claim 13, further comprising:
re-determine the first duration based on the portion of the second media content, as part of selecting the additional second media fragments associated with the additional portion of the second media content; and
re-select second media fragments associated with the portion of the second media content, as part of selecting the additional second media fragments associated with the additional portion of the second media content.

15. The method of claim 13, wherein the first fraction is 100% and the second fraction is 0% such that the selected second media fragments include only the first version audio fragments.

16. The method of claim 13, wherein the first fraction is less than 100% and the second fraction is greater than 0% such that the selected second media fragments include a plurality of the first version audio fragments and at least one of the second version audio fragments.

17. The method of claim 13, wherein the client manifest data is a manifest identifier, wherein the index associated with the second media fragments includes at least one of: a secondary content identifier, a start time of the second media fragments, a length of the second media fragments, or an indication of an audio version of the second media fragments, and wherein the additional index associated with the additional second media fragments includes at least one of: an additional secondary content identifier, a start time of the additional second media fragments, a length of the additional second media fragments, or an indication of an audio version of the additional second media fragments.

18. The method of claim 13, wherein the second version audio fragments of the second media content include one less frame of audio content than the first version audio fragments of the second media content and wherein the second version of the audio fragments of the additional second media includes one less frame of audio content than the first version of the audio fragments.

* * * * *